2,882,280
DIBENZANTHRONE VAT DYESTUFFS

Heinz Gruenebaum, Pittsburgh, and Philip Masciantonio, Coraopolis, Pa., assignors to Pittsburgh Coke & Chemical Company, Pittsburgh, Pa., a corporation of Pennsylvania No Drawing. Application February 14, 1955
Serial No. 488,114

13 Claims. (Cl. 260—355)

The present invention relates to the preparation of new derivatives of reduced anthraquinone vat dyestuffs.

The term vat dyestuffs is used to refer to those ketonic dyestuffs which must be reduced to a soluble form in their application to fibers. The reduction of ketonic dyestuff to the hydroxy, or leuco-derivative is generally spoken of as vatting. This vatting being effected with alkaline reducing agents the leuco compound generally exists as the water soluble alkali metal salt. The free leuco compound (free OH) can be obtained by acidifying the vat and filtering off the precipitate. This free leuco compound, however, is soluble in alkalies, and is unstable in air, being quickly oxidized back to the keto form. The alkali metal salts of the leuco are, likewise, very unstable to air oxidation and must be used in dyeing in the presence of excess reducing agent.

In many chemical reactions, where an especially reactive form of the anthraquinone or other vattable ketonic compound is desired, they are employed in the leuco form.

It is an object of the present invention to prepare a new leuco form of anthraquinone vat dyestuffs which is more stable to treatment with air or steam in dilute alkali.

It is another object of the present invention to prepare a new water insoluble product from the leuco form of an anthraquinone vat dyestuff which yields prints on cotton of much greater tinctorial strength when applied by conventional methods than the ordinary dispersed quinonoid vat dyestuffs.

It is a further object of the present invention to prepare a new reduced form of an anthraquinone vat dyestuff which, when applied by the padsteam method or orthodox print methods, requires considerably less reducing agent than conventional anthraquinone vat dyestuffs.

A still further object of the present invention is to prepare a new reduced form of an anthraquinone vat dyestuff which can be used to pigment pad cotton and other textile fabrics without the conventional ageing or reduction operation, but which merely requires an acid and oxidation treatment.

These and other objects of this invention will be fully understood from the following detailed description of a typical preferred form and application of the invention.

It has now been found that the attainment of these objects can be accomplished by reacting or treating the reduction product of a polynuclear ketone having the characteristics of a vat dye, more specifically, the leuco form of an anthraquinone vat dyestuff, with an aldehyde having at least two carbon atoms.

The reaction is carried out in a neutral or alkaline medium. The pH can range from 7 to 14, or even higher. Acid conditions have been found to be inoperative to produce the products of the present invention, as they lead to entirely different products.

As suitable materials for maintaining alkaline conditions, there can be used, for example, alkali metal hydroxides and carbonates, e.g., sodium hydroxide, potassium hydroxide and sodium carbonate, organic amines, including polyalkylene polyamines, e.g., tetramethylene pentamine and tetraethylene pentamine. Also formamide, dimethyl formamide and other alkyl including dialkyl substituted formamides can be employed.

Amines, such as the polyalkylene polyamines, give products having slightly different characteristics than those prepared in the presence of the inorganic bases. The particles of product are greener in appearance and the shade of the "strike off" of the vat paste on cotton prior to ageing is grey-green in color.

The reduction product or leuco compound may be in the form of the di-metal, e.g., disodium, metal hydrogen, e.g., sodium hydrogen or free leuco acid form, so long as the pH of the reaction mixture is not below about 7.

Virtually any aldehyde, having at least two carbon atoms, can be used. Formaldehyde, however, has been found to be inoperative. Specific examples of operative aldehydes are glyoxal, pyruvic aldehyde, chloral hydrate, acetaldehyde, octaldehyde, octadecanal, acrolein, oleyl aldehyde, crotonaldehyde, succinaldehyde, furfural, tetrahydrofurfural, benzaldehyde, cyclohexanal, glyoxylic acid, salicylaldehyde, m-nitrobenzaldehyde, ortho-chlorobenzaldehyde, m-benzaldehyde sulfonic acid, etc. The aldehyde can be a saturated or unsaturated heterocyclic, saturated or unsaturated aliphatic, acyclic, or aromatic compound and can also have other functional groups, such as sulfonic, nitro, hydroxy, etc., which do not react with hydroxyl groups or which react with hydroxyl groups more slowly than aldehyde groups react with hydroxyl groups under neutral to alkaline conditions. Preferably, the aldehyde used is glyoxal, pyruvic aldehyde or chloral hydrate.

As the anthraquinone vat dyestuff, there can be employed the leuco form of the dibenzanthrones, such as Bz-2, Bz-2' dihydroxydibenzanthrone (also called 12,12' dihydroxydibenzanthrone) and the ethers and esters thereof. Dialkyl ethers, such as Bz-2, Bz-2'-dimethoxy dibenzanthrone (Vat Jade Green) and the corresponding diethyl ether, the diethers formed, for example, by reacting 12,12' dihydroxy dibenzanthrone with ethylene oxide, propylene dibromide and other alkylating agents and esters made by reacting the parent dihydroxy compound with aliphatic acid chlorides, e.g., acetyl chloride and stearoyl chloride, are illustrative of such ethers and esters. Halogenated derivatives, e.g., dichloro and dibromo, of the dibenzanthrones mentioned above, can also be employed.

Other suitable anthraquinone vat dyestuffs usable in the leuco form thereof include violanthrone and the halogen derivatives thereof, e.g., Indanthrene Brilliant Violets 2R, 4R, and 3B, isoviolanthrone, the dibenzpyrenequinones, e.g., 3,4,8,9-dibenzpyrene-5,10-quinone, pyranthrone, pyranthrene, and the dibromo derivatives thereof, dinitro dibenzanthrone (Indanthrene Black 2B), dicloro isoviolanthrone.

The above dyestuffs are all characterized by the fact that they contain only carbocyclic rings. When aldehydes, such as aliphatic aldehydes or benzaldehyde, are reacted with aza benzanthrone or di-aza benzanthrone in the leuco form according to the teachings of the prior art, products entirely different from those of the present invention are obtained.

Without in any way limiting the present invention, a possible explanation of the compounds formed is that they are either a complex of the aldehyde and the leuco form of the vat dyestuff, or a new modification of the reduced vat dyestuff in quinhydrone form. In either event, they are water insoluble organic products and they retain the anthraquinone vat dyestuff nucleus.

The water insoluble product derived from the leuco compound of Jade Green B (Vat Jade Green) and glyoxal is greenish-blue in aqueous alkaline suspension and blue-violet or blue-green when dried. When pyridine is used as a solvent, the compound colors it blue-green. These two specific characteristics, among others, establish the uniquely different character of this product, as compared with the stable leuco compounds of Stallmann, Patent No. 2,148,042, which latter compounds color pyridine red and have a brownish-olive color when crystallized from an aqueous composition. When the above water insoluble product is treated with dilute mineral acid, e.g., hydrochloric acid, a pyridine solution thereof is red or red-violet.

The dry powder obtained on atmospheric drying of the present water insoluble product is quite stable and has the same general characteristics as the aqueous suspension. The products of the present invention have the desirable property of remaining essentially unchanged chemically on treatment with air or steam or a mixture of air and steam in dilute aqueous alkali at temperatures up to 80° C.

It has also been found that the products of the present invention yield prints on cotton of much greater tinctorial strength when applied by conventional methods than the comparable customary dispersed quinoid vat dyestuffs, e.g., Vat Jade Green.

When applied by the pad-steam method or orthodox print methods, the amount of reducing agent used ordinarily can be reduced very considerably. For example, when using sodium formaldehyde sulfoxylate, such as Rongalite or Formopon, as a reducing agent, only 30 parts of the reducing agent (in the print gum composition) need be used with 100 parts of the product (as a 12% paste) of the present invention, in contrast to 90 parts with conventional Vat Jade Green.

As previously stated, in order to prepare the present products, the alkalinity of the mixture is adjusted to 7 or higher. Preferably, a hydrosulfite vat with a pH of 13 or above is used, alkali metal hydrosulfites are especially preferred. The aldehyde is gradually added at a temperature of 0° to 100° C. to the vat until the aldehyde, e.g., glyoxal, is in excess and until a sample removed from the reaction mass indicates completion of reaction. The proportions of aldehyde to anthraquinone dyestuff on a mol basis can range from 1.0 to 1 to 170 to 1, preferably from 70 to 1 to 100 to 1. The ratio of aldehyde to anthraquinone dyestuff depends to some extent on the amount of free hydrosulfite, the hydrosulfite can be used in an amount of from 1 mol to 3 mols per mol of dyestuff. Preferably, the hydrosulfite is employed in excess of theory, e.g., 60% excess of theory.

The water present should be between 30 parts and 60 parts per part of dyestuff. Following completion of the reaction, the mixture is cooled, if necessary, filtered, washed and either dried or standardized in paste form in conventional manner.

Unless otherwise stated, all parts are parts by weight.

*Example I*

20 parts of the leuco form of Vat Jade Green are suspended in 200 parts of water containing 10 parts of caustic soda and 4 parts of sodium hydrosulfite. 20 parts of 30% glyoxal solution are added slowly at 40° to 60° C. over a period of one hour with good agitation. The product formed is filtered off and washed with water. The press cake is then made up into a dispersed water paste in conventional manner.

*Example II*

To 4000 parts of water containing 3 parts of a dispersing agent, Nekal BX (a sodium butyl naphthalene sulfonate), are charged 240 parts of 50% caustic soda solution. At 60° to 65° C., 90 parts sodium hydrosulfite (160% of theory) and 100 parts of dry dimethoxy dibenzanthrone (Vat Jade Green Base) are added. The mass is stirred at 60° to 70° C. until all the vattable material has been brought into solution. The time required is two hours. To this solution, 100 parts of a 30% aqueous glyoxal solution are added over two hours at 60° to 70° C. with good agitation until separation of the precipitate is completed. The insoluble product is then filtered off and washed with warm water. The press cake may then be converted into a paste of desired dye concentration, preferably 12.5%, adding glycerine and dispersing agents in conventional manner. Alternatively, the press cake may be dried at atmospheric pressure and steam-bath temperature or under reduced pressure to yield a greenish-blue or blue powder stable to oxidation under normal conditions. The product either dry or in press cake form imparts to pyridine a greenish-blue color which is stable. If the product is first treated with dilute mineral acid, e.g., hydrochloric acid, and then added to a pyridine, a bright red color is obtained at first, which changes fairly rapidly to a greenish-blue.

*Example III*

| | Parts |
|---|---|
| Jade Green (dry) | 240 |
| Water | 8000 |
| Caustic soda (50%) | 480 |
| Sodium hydrosulfite | 220 |

A mixture of the above materials is held at 55° to 65° C. for two hours in a first step. Then 125 parts of chloral hydrate and 75 parts of 50% caustic soda are added. The mixture is then stirred at 55° to 65° C. until complex formation is complete as indicated by a green-blue color in pyridine and a reddish color in pyridine after the complex is treated with dilute acid. The product separates from the aqueous reaction mass as a greenish precipitate. This is filtered off, washed with water and then is suitable for use in the form of a paste or as a dry solid.

The initial heating of the Jade Green with the sodium hydrosulfite solution can be carried out at various time intervals from ½ hour to 6 hours. Similarly, the reaction with chloral hydrate can be carried out at time intervals from ½ hour to 3 hours.

*Example IV*

The first step, including materials and proportions of this example, is identical with that of Example III. To the mixture of reduced Jade Green, caustic soda and excess sodium hydrosulfite in water, there are added 45 parts of pyruvic aldehyde (added as a 41% aqueous solution). This mixture is stirred at 20° to 60° C. until complex formation was complete, as indicated in the tests in Example III. The product is filtered off and purified as in Example III. The dyestuff was used in a 12.5% concentration in water for use in printing textile fabric.

*Example V*

The first step of this example, including materials and proportions, is identical with the first step of Example III. To the mixture of reduced Jade Green, water, sodium hydroxide and excess sodium hydrosulfite, there are added 13 parts of tetramethylene pentamine, 45 parts of pyruvic aldehyde and 45 parts of glycerine. The mixture is then stirred at 20° to 60° C. until complex formation is complete, as indicated by the tests recited in Example III.

In preparing the new stable water insoluble reduction products, technically crude dimethoxy dibenzanthrone may be employed quite satisfactorily, in contrast to the pure starting material required in the Stallmann patent. For example, the presence of organic vat soluble or insoluble products and/or the presence of inorganic salts does not affect the formation or stability characteristics of the product—as distinguished from the Stallman patent—wherein the regulation of all these factors is critical to obtain the product claimed therein. Aqueous dye pastes made up by using 5 to 60% of the stable reduction product of the present invention and, incorporating conventional dispersing agents and printing assistants are particularly valuable for their significantaly improved printing performance, as compared with the color yield obtained, using vat dye dispersions of the same dye without using the present treatment. The product may be applied, using either a regular print paste or one incorporating significantly lesser amount of reducing agent than is normally employed with prior leuco dyestuffs of the present type, as shown in the examples below. This is obviously desirable from the economic standpoint.

*Example VI*

10 parts of color paste containing 12.5% of the dye yielding organic materials of Example III are incorporated into 90 parts of a printing gum made up by steps (a) and (b) below:

(a)

| | Parts |
|---|---|
| Wheat starch | 50 |
| British gum | 200 | stirred with 300 parts of water are cooked to a uniform paste by heating for ½ to 1 hour at 170° to 180° C.

To this mass, there is added a mixture of:

(b)

| | Parts |
|---|---|
| Water | 200 |
| Potassium carbonate | 100 |
| Formopon | 100 |
| Glycerine | 50 |

The mass is stirred well and cooled to room temperature with agitation. The mixture is strained to remove any lumps present. Cotton is then printed with the above formed color paste, dried, steamed in a suitable ager by conventional methods and then acid oxidized, washed, soaped at the boil, washed again and dried also in conventional manner. Prints obtained in this fashion are stronger and somewhat brighter than those obtained using dye pastes containing the non-reduced vat dye.

Satisfactory prints can be obtained by reducing the amount of Formopon or equivalent sulfoxylate in Example VI to 30 parts. Good prints are also obtained by reducing the amount of alkali in Example VI. For example, the 100 parts of potassium carbonate can be reduced to 40 parts. Alternatively, a mixture of 10 parts of caustic soda and 30 parts of potassium carbonate can be employed as the alkali. In view of the nature of the new leuco product, considerable variation in the composition of the print gum is permitted, while still giving satisfactory prints. This results in significant savings in the cost of the composition.

The new leuco product also can be employed in the conventional pigment-padding method. The leuco product is applied to the fiber in conventional manner, using the customary or decreased amounts of reducing agents. The fact that lesser amounts of reducing agents can be employed with the present product, in comparison to the case with prior art leuco anthraquinone dyestuffs, is an outstanding advantage for the present products.

*Example VII*

To 250 ccs. of water, there are added 10 grams of paste containing 12.5% of the stabilized reduced compound of Example III. The temperature is adjusted to 100° to 130° F., e.g., 115° F., and the fabric padded in this medium. The padded fabric is then developed in a bath containing 150 ccs. of water, 4 grams of 35% caustic soda and 1.5 grams of sodium hydrosulfite for 10 to 15 minutes and oxidized, washed, soaped, washed again and dried in conventional manner.

*Example VIII*

This example is similar to Example VII, but the fabric is passed after rapid impregnation in the reducing bath into an ager, where it is developed with steam under 5 p.s.i. pressure for one minute. Either atmospheric or superatmospheric pressure can be employed in the steam treatment.

Fast solid shades are obtained by using the new leuco dyestuff in the pigment padding method. The results are superior to those obtained when using non-reduced vat dye pastes.

We claim:

1. A water insoluble organic product obtained by the action at a pH of at least 7 in the presence of water and a reducing agent of an aldehyde having at least two carbon atoms on a leuco anthraquinone vat dyestuff, the only rings of which are carbocyclic.

2. The process comprising reacting an aldehyde having at least two carbon atoms on the leuco form of a dialkyl ether of dibenzanthrone, said reaction being carried out at a pH of at least 7 in the presence of water and a reducing agent.

3. A process comprising reacting the leuco form of an anthraquinone vat dyestuff, the only rings of which are carbocyclic with an aldehyde having at least two carbon atoms at a pH of at least 7 in the presence of water and a reducing agent.

4. The process of claim 3, wherein the reaction is carried out in the presence of a basic alkali metal compound.

5. The process of claim 3, wherein the reaction is carried out in the presence of a polyalkylene polyamine.

6. The process of claim 3, wherein the reaction is carried out in the presence of an amide selected from the group consisting of formamide and alkyl derivatives thereof.

7. The process of claim 3, wherein there are used from 1 to 170 mols af aldehyde per mol of anthraquinone dyestuff and there are also present 30 parts to 60 parts of water per part of dyestuff.

8. A process according to claim 3, wherein the dyestuff is Bz-2, Bz-2'-dimethoxy dibenzanthrone, and the aldehyde is glyoxal.

9. A process according to claim 3, wherein the dyestuff is Bz-2, Bz-2'-dimethoxy dibenzanthrone, and the aldehyde is pyruvic aldehyde.

10. A process according to claim 3, wherein the dyestuff is Bz-2, Bz-2'-dimethoxy dibenzanthrone, and the aldehyde is chloral.

11. The process of claim 7, wherein there are also present 2 mols to 5 mols of an alkaline hydrosulfite per mol of dyestuff.

12. The process of claim 11, in which the dyestuff is Bz-2, Bz-2'-dimethoxy dibenzanthrone.

13. The process of claim 12, wherein the aldehyde is selected from the group consisting of glyoxal, pyruvic aldehyde and chloral.

References Cited in the file of this patent

UNITED STATES PATENTS

| 2,082,560 | Wuertz | June 1, 1937 |
| 2,148,042 | Stallmann | Feb. 25, 1939 |
| 2,183,626 | Stallmann | Dec. 19, 1939 |
| 2,389,245 | Wiazmitinow | Nov. 20, 1945 |
| 2,447,993 | Vieira | Aug. 24, 1948 |
| 2,487,197 | Stott | Nov. 8, 1949 |
| 2,592,852 | Billingsley | Apr. 15, 1952 |